United States Patent
Burghardt

(10) Patent No.: US 9,828,911 B2
(45) Date of Patent: Nov. 28, 2017

(54) TURBOFAN JET ENGINE WITH LOW PRESSURE SHAFT PASSING OUTSIDE OF CORE ENGINE

(71) Applicant: Rolls-Royce Deutschland Ltd & Co KG, Blankenfelde-Mahlow (DE)

(72) Inventor: Sascha Burghardt, Vogelsdorf (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 309 days.

(21) Appl. No.: 14/327,013

(22) Filed: Jul. 9, 2014

(65) Prior Publication Data

US 2015/0013307 A1 Jan. 15, 2015

(30) Foreign Application Priority Data

Jul. 10, 2013 (DE) .......................... 10 2013 213 518

(51) Int. Cl.
| | |
|---|---|
| *F02C 6/02* | (2006.01) |
| *F02C 3/10* | (2006.01) |
| *F02C 3/045* | (2006.01) |
| *F01D 13/02* | (2006.01) |
| *F01D 13/00* | (2006.01) |

(52) U.S. Cl.
CPC ............ *F02C 3/045* (2013.01); *F01D 13/003* (2013.01); *F01D 13/02* (2013.01); *F02C 3/10* (2013.01); *F02C 6/02* (2013.01); *F05D 2250/312* (2013.01)

(58) Field of Classification Search
CPC .... F02C 3/045; F02C 3/10; F02C 6/02; F01D 13/02; F01D 13/003; F05D 2250/312
See application file for complete search history.

(56) References Cited

U.S. PATENT DOCUMENTS

| | | |
|---|---|---|
| 2,168,726 A | 8/1939 | Whittel |
| 3,355,890 A | 12/1967 | Gottfried |
| 3,368,352 A | 2/1968 | Hewson |

(Continued)

FOREIGN PATENT DOCUMENTS

| | | |
|---|---|---|
| DE | 102008011643 | 9/2009 |
| EP | 1331386 | 3/2007 |

(Continued)

OTHER PUBLICATIONS

German Search Report dated Mar. 13, 2014 from counterpart App No. 10 2013 213 518.1.

(Continued)

*Primary Examiner* — Carlos A Rivera
(74) *Attorney, Agent, or Firm* — Shuttleworth & Ingersoll, PLC; Timothy J. Klima

(57) ABSTRACT

A turbofan engine includes a core engine, having a high-pressure compressor, a combustion chamber and a high-pressure turbine which are coupled to one another via a high-pressure shaft, at least one fan from which gas is supplied into both a primary flow duct and a secondary flow duct of the turbofan engine, at least one low-pressure turbine arranged behind the core engine, and at least one low-pressure shaft, with each low-pressure shaft coupling a fan to a low-pressure turbine. It has been provided that no low-pressure shaft of the turbofan engine passes through the core engine.

12 Claims, 5 Drawing Sheets

(56) References Cited

U.S. PATENT DOCUMENTS

| | | | |
|---|---|---|---|
| 4,149,374 A * | 4/1979 | Barchenko | F02C 7/36 |
| | | | 60/225 |
| 6,792,745 B2 * | 9/2004 | Wojciechowski | F02K 3/06 |
| | | | 60/224 |
| 6,834,495 B2 | 12/2004 | Saito et al. | |
| 6,845,606 B2 | 1/2005 | Franchet et al. | |
| 7,752,834 B2 * | 7/2010 | Addis | B64D 27/10 |
| | | | 244/60 |
| 7,802,757 B2 | 9/2010 | Dooley et al. | |
| 7,877,980 B2 * | 2/2011 | Johnson | F02K 3/075 |
| | | | 60/226.1 |
| 8,402,740 B2 | 3/2013 | Guemmer | |
| 2006/0185346 A1 | 8/2006 | Rolt | |
| 2009/0229243 A1 * | 9/2009 | Guemmer | B64D 27/12 |
| | | | 60/226.1 |
| 2010/0011741 A1 * | 1/2010 | Babu | F01D 13/003 |
| | | | 60/226.1 |
| 2010/0146965 A1 * | 6/2010 | Easley, Jr. | F02B 37/001 |
| | | | 60/602 |

FOREIGN PATENT DOCUMENTS

| | | |
|---|---|---|
| FR | 980416 | 5/1951 |
| WO | 2007/024674 | 3/2007 |

OTHER PUBLICATIONS

European Search Report dated Sep. 19, 2014 from counterpart App No. 14176014.0.

* cited by examiner

TURBOFAN JET ENGINE WITH LOW PRESSURE SHAFT PASSING OUTSIDE OF CORE ENGINE

CROSS-REFERENCE TO RELATED APPLICATION

This application claims priority to German Patent Application No. DE102013213518.1 filed on Jul. 10, 2013, the entirety of which is incorporated by reference herein.

BACKGROUND

This invention relates to a turbofan engine.

Turbofan engines are also referred to as bypass engines or dual-flow turbine jet engines or fan engines. They are characterized in that the fan (also termed "blower") is driven by a multi-stage low-pressure turbine arranged behind a core engine, where a major proportion of the air mass ingested by the engine is accelerated past the core engine. The engine forms here a primary flow duct through the core engine and a secondary flow duct for the outer airflow routed past the core engine.

A two-shaft turbofan engine is classically designed such that it has two shafts, i.e. a first shaft that couples the low-pressure turbine to the fan, and is also referred to as low-pressure shaft, and a second shaft that couples the high-pressure turbine to the high-pressure compressor, and is also referred to as high-pressure shaft. The shaft design is such that the low-pressure shaft is passed through the high-pressure shaft, i.e. they are installed coaxially.

The general intention must be to provide engines with a fan having a large diameter, in order to increase the bypass ratio and thereby make the engines more efficient and less noisy. There is therefore a need to develop engines with fans (fan stages) with increasingly larger dimensions.

An increase in the fan diameter however causes problems. On the one hand it must be taken into consideration that aircraft engines are frequently installed under the wings of an aircraft. It must be ensured here that a minimum clearance from the ground is provided, as illustrated in FIG. 5. The permitted size of the fan therefore depends, among other things, on the vertical position of the wing on the aircraft, on the vertical clearance of the engine from the wing and on the ground clearance to be considered.

On the other hand, the situation is such that the fan turns more slowly as the diameter increases. The low-pressure shaft turns correspondingly more slowly as the fan diameter increases. As a result, the load (torque) to be transmitted by the low-pressure shaft increases, for which reason the low-pressure shaft must be designed thicker. This in turn leads to an increased installation space for the low-pressure shaft. Since the low-pressure shaft is installed coaxially with the high-pressure shaft, this leads at the same time to an increased installation space in the core engine. This however runs counter to the general efforts being made in engine technology to keep reducing the size of the core engine by continually increasing the compression ratios.

A turbofan engine is known from US 2006/0185346 A1 that has two low-pressure turbines and two fans, each connected to one another by a low-pressure shaft, where the air mass exiting the core engine initially flows through the one low-pressure turbine and then through the other low-pressure turbine. The two low-pressure shafts are here arranged at an angle. This angled arrangement must be deemed disadvantageous, since it prevents straight thrust vectors from being achieved. Also, the aforementioned installation space problem in the core engine is not remedied, since one of the two low-pressure shafts runs coaxially to the high-pressure shaft of the core engine.

A turbofan engine is known from US 2010/0011741 A1 that has a low-pressure shaft coupled at its axial front end via a gearbox to two parallel-arranged shafts which each drive their own fan. With this engine too, the aforementioned installation space problem in the area of the core engine is not remedied, since the low-pressure shaft is passed through the core engine.

SUMMARY

An object underlying the present invention is to provide a turbofan engine permitting the design of a small core engine even when a large bypass ratio is provided.

The solution in accordance with the invention therefore provides that the high-pressure shaft and the low-pressure shaft(s) are arranged in a turbofan engine such that no low-pressure shaft of the turbofan engine passes through the core engine. There is therefore no low-pressure shaft passing through the core engine, neither in the event that the turbofan engine has precisely one low-pressure shaft, nor in the event that the turbofan engine has a plurality of low-pressure shafts.

Because the low-pressure shaft is not passed through the core engine, no installation space is needed in the core engine for the arrangement of the low-pressure shaft, for which reason the core engine can be reduced in size. At the same time it is possible, if the engine has a slowly turning fan with large diameter in order to provide a large bypass ratio, to design the low-pressure shaft thicker without this increasing the installation space in the core engine. If the engine has several fans and low-pressure shafts, a large bypass ratio is provided by the plurality of fans.

The solution in accordance with the invention means that no low-pressure shaft of the turbofan engine runs coaxially to the high-pressure shaft of the turbofan engine. Instead, the high-pressure shaft and the low-pressure shaft are arranged at a distance from one another in the radial direction of the engine.

According to an embodiment of the invention, it is provided that the low-pressure shaft or—in the event that several low-pressure shafts are present—each of these low-pressure shafts runs substantially parallel to the high-pressure shaft. Minor divergences from parallelism in the range between 1° and 5° are still regarded here as substantially parallel. The parallel arrangement permits, unlike in the state of the art of US 2006/0185346 A1, the provision of thrust vectors that are designed straight.

Alternatively, the low-pressure shaft or, in the event that several low-pressure shafts are provided, each of these low-pressure shafts can be angled to the high-pressure shaft. In the case of several low-pressure shafts too, the latter can be angled to one another.

In order to ensure that the low-pressure shaft does not pass through the core engine, it is provided according to an exemplary embodiment that the primary flow duct or part-ducts of the primary flow duct are deflected in front of and behind the core engine in the radial direction such that the area of the primary flow duct passing through the core engine is radially spaced from the secondary flow duct or, if several secondary flow ducts are provided, is radially spaced from each of the secondary flow ducts. The primary flow duct thus includes, adjacent to the fan, areas, ducts or sections which are curved and which deflect the air mass ingested by the fan with a radial component and then supply it in the axial direction to the core engine. In the same way, areas, ducts or sections of the primary flow duct are provided which have a curved course behind the core engine and which supply air accelerated by the core engine to the low-pressure turbine or the low-pressure turbines.

Accordingly, it is provided in accordance with an embodiment of the invention that relative to the flow direction an axially front end of the primary flow duct is provided behind each fan and an axially rear end of the primary flow duct is provided in front of each low-pressure turbine. It can be provided here that behind each fan and in front of each low-pressure turbine the primary flow duct or sections thereof run in a curve such that the air mass is guided in the area of the core engine substantially with solely axial alignment. To do so, it can be provided that the curvature of the primary flow duct in front of and behind the core engine passes through a turning point.

In an embodiment of the invention, the engine includes at least two fans and at least two low-pressure turbines, where a fan and a low-pressure turbine are coupled to one another by a low-pressure shaft in each case. However, the core engine includes here only a single high-pressure shaft. The engine has two or more secondary flow ducts to match the number of fans and low-pressure turbines.

The use of more than one fan enables the provision of a high bypass ratio, without having to provide fans of large diameter. For example, this embodiment of the invention permits the provision of a bypass ratio ranging from 15:1 to 20:1. It is also possible by the use of smaller fans to design the low-pressure shafts to rotate faster and to be thinner.

According to a design variant, the primary flow duct forms at its axially front end at least two ducts which merge in front of the core engine, where each duct is associated with one of the fans, so that part of the airflow passing the respective fan is guided into each duct. It is also provided that the primary flow duct splits behind the core engine into at least two ducts which each lead to one of the low-pressure turbines. This ensures on the one hand that each of the fans provides air mass for the core engine, and on the other hand that the gas flow leaving the core engine is supplied to each of the low-pressure turbines, in order to set the latter to rotate in order to drive the fans.

The engine includes in an advantageous embodiment at least one outer casing that defines several secondary flow ducts matching the number of fans. Here, part of the gas flow passing each fan is guided into one of the respective secondary flow ducts. It can be provided that the secondary flow ducts end in the axial direction in front of the primary flow duct, i.e. the nozzle rim of the outer "cold" nozzle is in front of the nozzle rim of the inner "hot" nozzle in the axial direction.

In accordance with a further embodiment of the invention, the engine includes two fans, two low-pressure turbines and two low-pressure shafts. The core engine is arranged here offset to the plane defined by the two low-pressure shafts. In other words, the core engine is located above or below the plane defined by the two low-pressure shafts: it is lifted or lowered. This has the advantage that the fans can be arranged at a shorter distance from one another.

If the engine has more than two fans, low-pressure turbines and low-pressure shafts, they are for example arranged symmetrically, with the core engine being arranged centrally relative to the axes defined by the low-pressure shafts.

It is pointed out that the solution in accordance with the present invention is not restricted to core engines having a high-pressure compressor and a high-pressure turbine. In further embodiments of the invention, it can be provided that the core engine furthermore has a medium-pressure compressor and a medium-pressure turbine coupled to one another by a medium-pressure shaft. A medium-pressure shaft of this type runs here coaxially to the high-pressure shaft.

It is further pointed out that according to the solution in accordance with the invention, the use of a reduction gear between the low-pressure shaft and the associated fan is not necessary. The required speed of the fan(s) is set directly by the low-pressure turbine(s). However, the solution in accordance with the invention does not preclude in design variants the additional use of a reduction gear in the force path between the low-pressure shaft and the respective fan.

BRIEF DESCRIPTION OF THE DRAWINGS

The present invention is described in the following with reference to the figures of the accompanying drawings, showing several exemplary embodiments.

DETAILED DESCRIPTION

Figure 1:
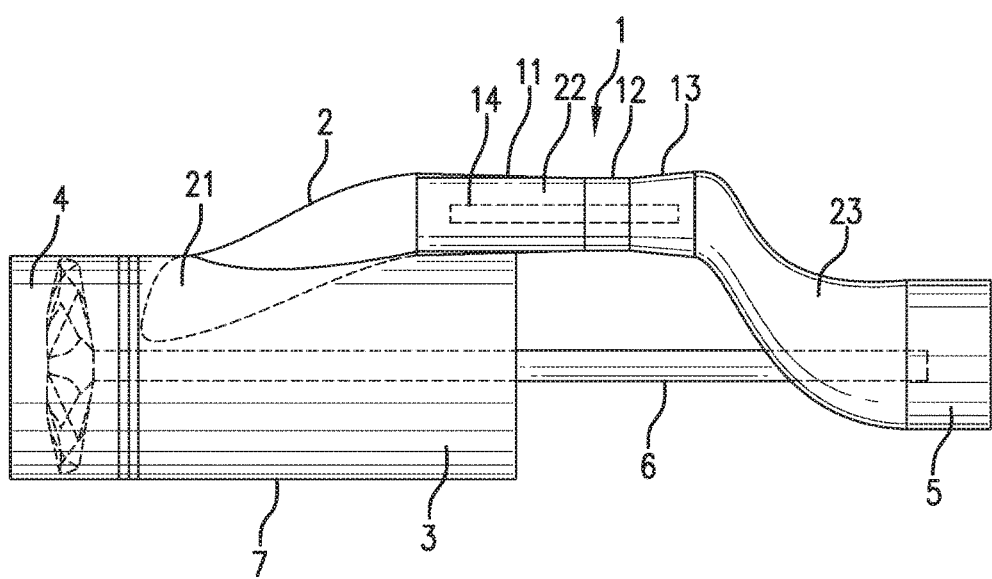
FIG. 1 schematically shows a longitudinal view of a first exemplary embodiment of a turbofan engine, with the turbofan engine being provided with a high-pressure shaft and a low-pressure shaft and with the low-pressure shaft not passing through the core engine.

FIG. 1 shows in a side view a first exemplary embodiment of a turbofan engine, where a low-pressure shaft of the turbofan engine is not passed through the core engine of the turbofan engine. The illustration in FIG. 1 is schematic and is restricted to the representation of those components of an engine that are relevant for the invention. Further components of an engine, such as casing, bearings, auxiliary units and drives that an engine typically has and that are known per se to the person skilled in the art, are not shown separately in FIG. 1. The same applies for FIGS. 2 to 4.

According to FIG. 1, the turbofan engine includes a core engine 1, which is provided with a high-pressure compressor 11, a combustion chamber 12 and a high-pressure turbine 13, each being again shown schematically. The high-pressure turbine 13 and the high-pressure compressor 11 are coupled to one another via a first shaft, hereinafter referred to as high-pressure shaft.

The engine of FIG. 1 furthermore includes a fan 4, which is arranged in the area of an inlet of the engine. The fan 4 is also referred to as fan stage. The fan 4 is driven by a second shaft 6, hereinafter referred to as low-pressure shaft. The low-pressure shaft 6 is connected to a low-pressure turbine 5. The low-pressure turbine 5 and the fan 4 are thus coupled to one another via the low-pressure shaft 6. It is provided here that the coupling between the low-pressure turbine 5 and the fan 4 is designed without a reduction gear in the low-pressure shaft system. Alternatively, a reduction gear can be additionally provided in the force path between the low-pressure shaft 6 and the fan 4.

The fan 4 is arranged in an outer casing 7, which defines a secondary flow duct 3. The air mass ingested by the fan 4 and flowing into the secondary flow duct 3 is accelerated past the core engine 1.

The engine furthermore has a primary flow duct 2 supplying part of the air mass ingested by the fan 4 to the core engine 1. The primary flow duct 2 here has substantially three sections 21, 22, 23 arranged one behind the other in the axial direction.

The first section 21 is arranged behind the fan 4 and is used to receive a proportion of the air mass ingested by the fan 4. The first section 21 is here shaped such that its course in the axial direction also has a radial component, so that the air flowed into the section 21 is passed radially to the outside. In the second part-section 22, the primary flow duct 2 runs in the axial direction. The curvature of the first part-section 21 has a turning point here.

The third part-section 23 adjoining the second part-section 22 is in turn designed curved and includes a component in the radial direction towards the low-pressure shaft 6, so that the axially rear end of the third part-section 23 ends in front of the low-pressure turbine 5 and supplies the latter with the gas flow provided by the core engine 1. This drives the low-pressure turbine 5, which transmits its torque via the low-pressure shaft 6 to the fan 4.

The turbofan engine of FIG. 1 is characterized in that the low-pressure shaft 6 is not passed through the core engine 1. Instead, the low-pressure shaft 6 and the high-pressure shaft 14 are spaced in the radial direction. Accordingly, the low-pressure shaft 6 does not run coaxially to the high-pressure shaft 14 of the core engine 1. The low-pressure shaft 6 and the high-pressure shaft 14 run parallel to one another, so that the engine provides straight thrust vectors.

Since the low-pressure shaft 6 does not pass through the core engine 1 and is not designed coaxial to the high-pressure shaft 14, the core engine 1 can be designed with a small size. At the same time, it is possible to provide a slowly turning fan 4 with large diameter, with no installation space of the core engine 1 being used up by the thickness of the low-pressure shaft 6 required for this case.

Figure 2:
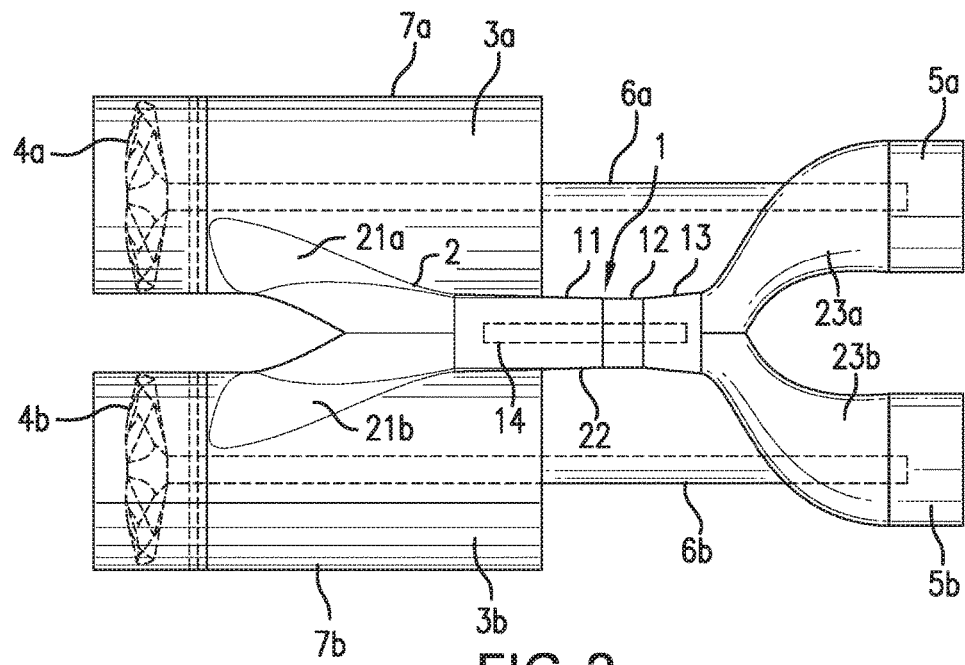
FIG. 2 schematically shows a top view of a second exemplary embodiment of a turbofan engine, with the turbofan engine being provided with a high-pressure shaft and two low-pressure shafts, each extending parallel to one another.

FIG. 2 shows a further exemplary embodiment of a turbofan engine, where the low-pressure shaft of the engine does not pass through the core engine. The exemplary embodiment of FIG. 2 includes two fans 4a, 4b and accordingly also two low-pressure turbines 5a, 5b, each being coupled to one of the fans 4a, 4b via a low-pressure shaft 6a, 6b. The engine however only includes one core engine 1 with a high-pressure compressor 11, a combustion chamber 12, a high-pressure turbine 13 and a high-pressure shaft 14.

The two fans 4a, 4b are located in outer casings 7a, 7b respectively, which define two secondary flow ducts 3a, 3b.

The primary flow duct 2 in the present exemplary embodiment is designed such that it forms at its axially front end two ducts or front part-sections 21a, 21b which merge in front of and in the core engine 1 to a section 22. Each of the ducts 21a, 21b is associated with one of the fans 4a, 4b, so that part of the airflow passing the respective fan 4a, 4b is guided into each duct 21a, 21b. The proportion of the air mass ingested by the respective fan 4a, 4b and not guided into the respective duct 21a, 21b flows past the core engine 1 as a bypass flow. Downstream of the core engine 1, the primary flow duct 2 splits into two rear part-sections or rear ducts 23a, 23b which lead to one of the low-pressure turbines 5a, 5b respectively, which are driven via this duct 23a, 23b respectively with gas provided by the core engine 1.

It is pointed out that the two low-pressure shafts 6a, 6b in the exemplary embodiment shown are arranged parallel to one another and at the same time parallel to the high-pressure shaft 14. Alternatively, the low-pressure shafts 6a, 6b can be arranged at an angle, where preferably a low angularity of 1° to 5°, for example, is provided, in order not to lose any parallelism of the thrust vectors.

The courses of the two front part-sections 21a, 21b and the two rear part-sections 23a, 23b of the primary flow duct each have again a radial component in the axial direction (with an increasing radial distance to the respective low-pressure shaft 6a, 6b for the front sections 21a, 21b and a decreasing radial distance to the respective low-pressure shafts 6a, 6b for the rear sections 23a, 23b). To that extent, reference is made additionally to the description of the part-sections 21 and 23 in the primary flow duct 2 of the exemplary embodiment in FIG. 1.

Figure 3:
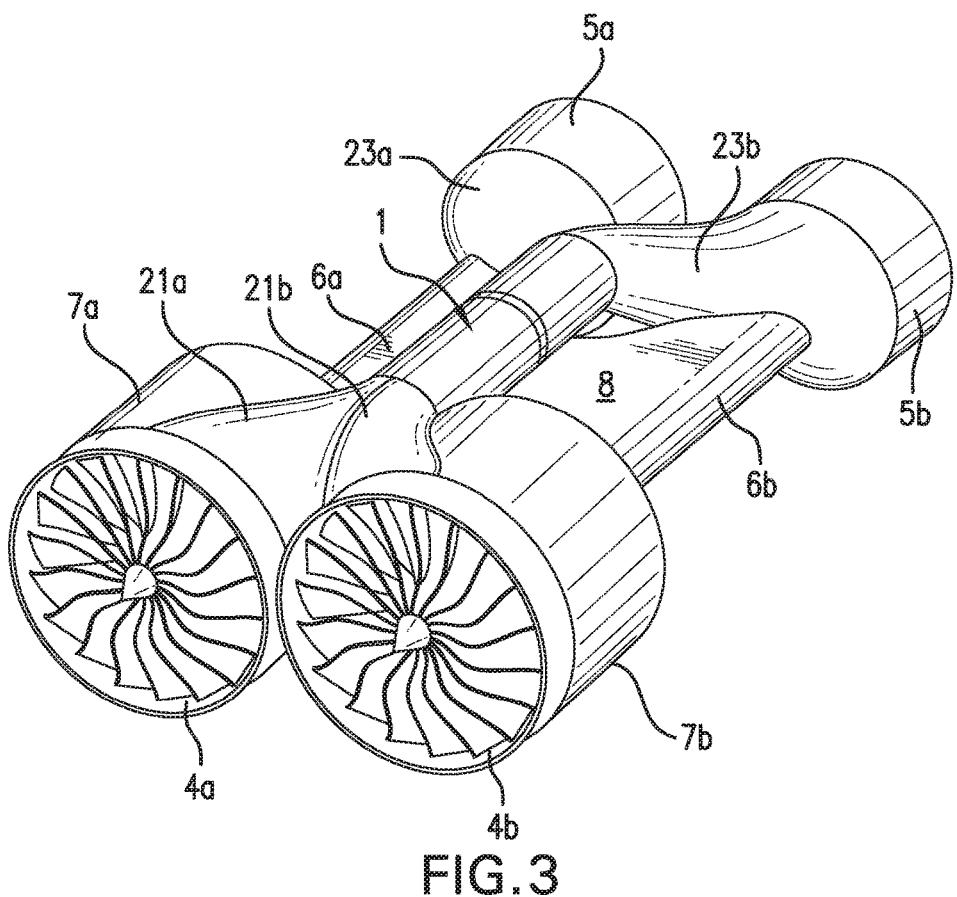
FIG. 3 shows in perspective view the turbofan engine of FIG. 2, however with the high-pressure shaft being arranged in another plane relative to the low-pressure shafts.

FIG. 3 shows the turbofan engine of FIG. 2 in a perspective view, where the two fans 4a, 4b, their outer casings 7a, 7b, the core engine 1, the ducts 21a, 21b and 23a, 23b of the primary flow duct, the low-pressure shafts 6a, 6b and the low-pressure turbines 5a, 5b can be discerned. Furthermore, a casing 8 provided in the plane of the two low-pressure shafts 6a, 6b is schematically represented which can have bearings, auxiliary units, drives etc. in a manner known per se.

It is pointed out that in the exemplary embodiment shown the core engine 1 is arranged offset to the plane defined by the two low-pressure shafts 6a, 6b. As a result, the core engine 1 is raised relative to this plane. This has the advantage that the two fans 4a, 4b can be arranged closer next to one another than in the alternative case where the core engine 1 is located in the plane of the two low-pressure shafts 6a, 6b. It is however pointed out that in alternative embodiments it can easily be provided that the core engine 1 is arranged in the plane established by the two low-pressure shafts 6a, 6b.

Figure 4:
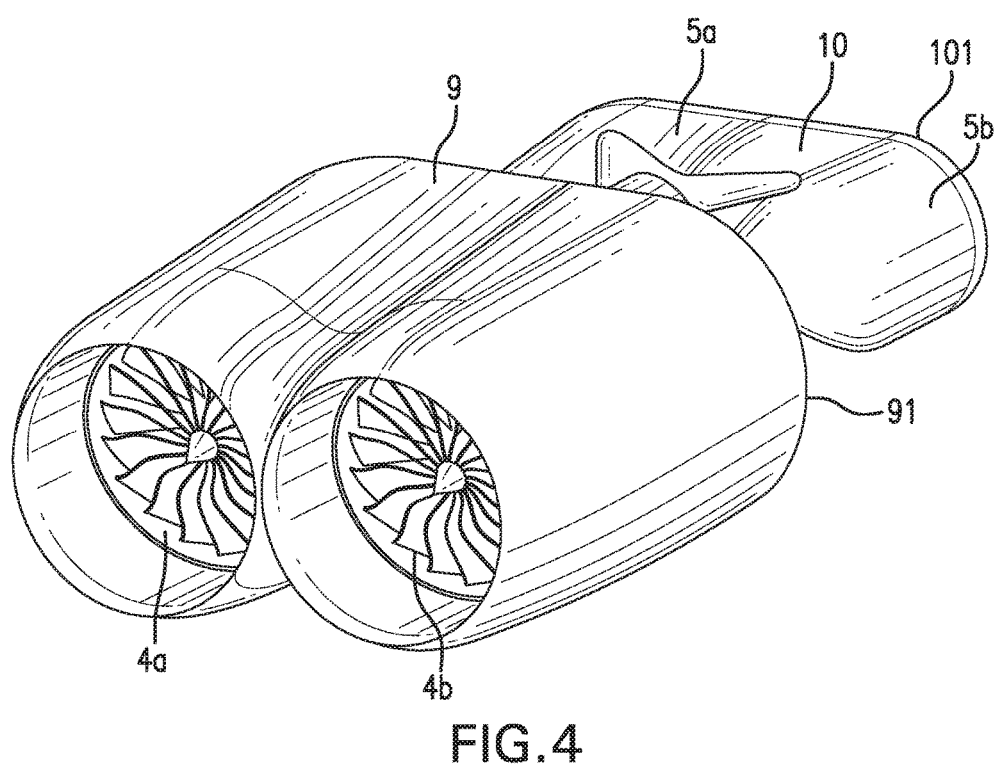
FIG. 4 shows the turbofan engine of FIG. 3, additionally illustrating a nacelle.
Figure 5:
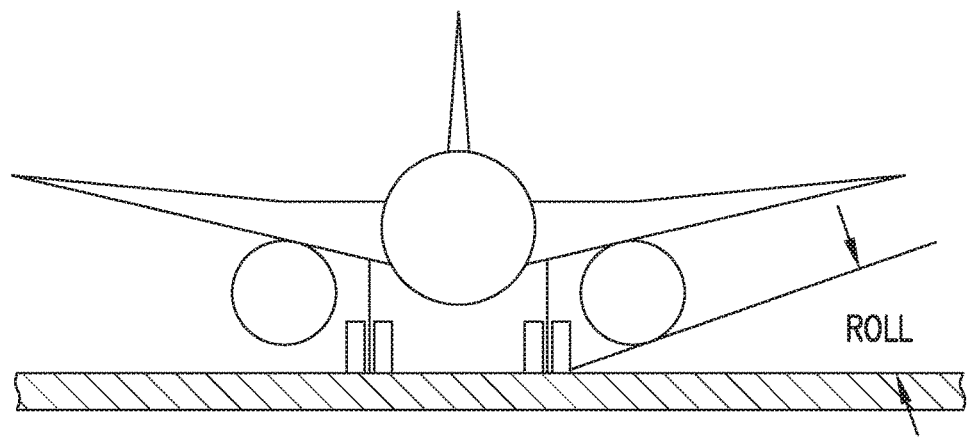
FIG. 5 schematically shows the arrangement of aircraft engines installed under the wings of an aircraft.

FIG. 4 shows the engine of FIG. 3 with additional representation of a nacelle 9 used for aerodynamic cladding of the engine. The nacelle defines a bypass nozzle having an axially rear nozzle rim 91 at which the bypass ducts end. This rear nozzle rim is also referred to as the "cold nozzle". It is furthermore provided that the two low-pressure turbines 5a, 5b are surrounded by a casing 10 that delimits the core flow nozzle of the engine and has a rear nozzle rim 101 at which the primary flow duct ends.

Figure 6:
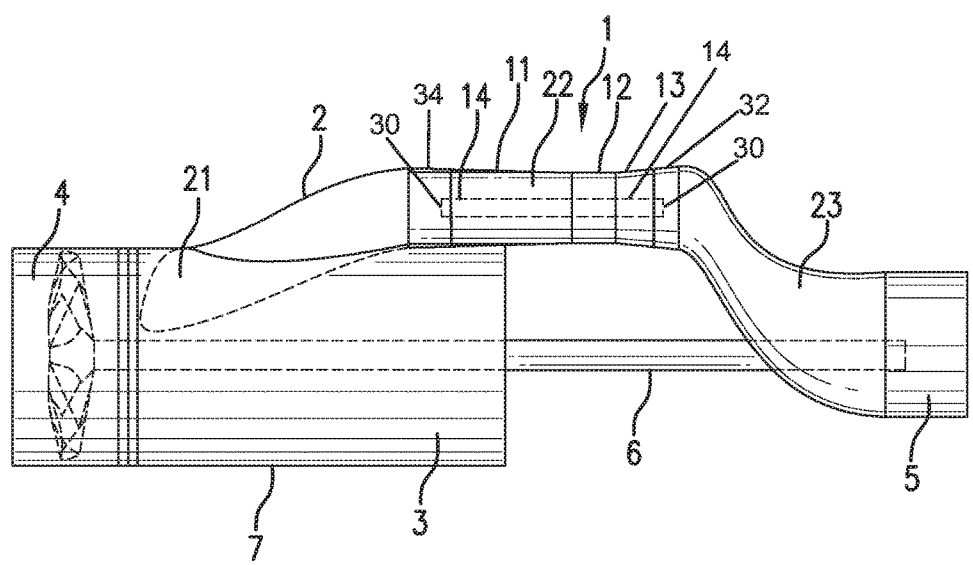
FIG. 6 schematically shows a longitudinal view of a third exemplary embodiment of a turbofan engine, with the turbofan engine being provided with a high-pressure shaft, medium pressure shaft and a low-pressure shaft and with the low-pressure shaft not passing through the core engine.

FIG. 6 schematically shows a longitudinal view of a third exemplary embodiment of a turbofan engine 1, with the turbofan engine 1 being provided with a high-pressure shaft 14 connecting the high pressure turbine 13 with the high pressure compressor 11, a medium pressure shaft 30 connecting a medium pressure turbine 32 with a medium pressure compressor 34 and a low-pressure shaft 6 connecting low pressure turbine 5 with fan 4, with the low-pressure shaft 6 not passing through the core engine 1. The medium pressure shaft 30 runs coaxially to the high-pressure shaft 14.

The turbofan engine described permits an enlargement of the fan volume to increase aerodynamic efficiency. The hub ratio of the fans can be reduced here at the same time when several fans are used. The invention also permits a high bypass ratio to increase the aerodynamic efficiency. The separate arrangement of low-pressure shaft and high-pressure shaft permits a size reduction of the core engine, which also increases thermodynamic efficiency. The result is also an improvement in maintenance access to the engine components. The separation of low-pressure shaft and high-pressure shaft furthermore leads to the installation space used for the low-pressure shaft not being limited by the size of the core engine.

The solution in accordance with the invention furthermore permits an increase in the number of low-pressure turbine stages, which likewise improves thermodynamic efficiency. Parallel arrangement of the low-pressure shaft(s) and the high-pressure shaft permits a straight alignment of the thrust vectors of the engine.

The present invention, in its design, is not restricted to the exemplary embodiments presented above, which are only to be understood as examples. In alternative embodiments it can be provided for instance that instead of two fans, the turbofan engine has a larger number of fans and accordingly of low-pressure turbines and low-pressure shafts with only one core engine. Also, the design of the components illustrated and the courses of the primary flow duct and the secondary flow ducts must be understood only as examples.

What is claimed is:

1. An aircraft turbofan engine comprising:
   only one core engine, including a high-pressure compressor, a combustion chamber and a high-pressure turbine which are coupled to one another via a high-pressure shaft,
   a primary flow duct for flowing air into the core engine,
   a secondary flow duct for flowing air outside the core engine,
   at least one fan for supplying air into both the primary flow duct and the secondary flow duct, wherein the secondary flow duct and the core engine have a same flow direction, the at least one fan driving a major proportion of an air mass ingested by the aircraft turbofan engine into the secondary flow duct past the core engine for propulsion of the aircraft turbofan engine,
   at least one low-pressure turbine arranged behind the core engine, and
   at least one low-pressure shaft coupling the at least one fan to the at least one low-pressure turbine,
   wherein none of the at least one low-pressure shaft of the turbofan engine passes through the core engine;
   wherein each one of the at least one low-pressure shaft runs substantially parallel to the high-pressure shaft, such that a deviation from parallel between each one of the at least one low-pressure shaft and the high-pressure shaft is no greater than 5°;
   wherein the at least one fan comprises at least two fans;
   wherein the at least one low-pressure turbine comprises at least two low-pressure turbines; and
   wherein the at least one low-pressure shaft comprises at least two low-pressure shafts, with each of the least two fans being respectively coupled to one of the at least two low-pressure turbines by one of the at least two low-pressure shafts.

2. The aircraft turbofan engine in accordance with claim 1, wherein none of the at least two low-pressure shafts of the turbofan engine runs coaxially to the high-pressure shaft of the turbofan engine.

3. The aircraft turbofan engine in accordance with claim 1, wherein the primary flow duct or part-ducts of the primary flow duct are deflected in front of and behind the core engine in a radial direction such that a section of the primary flow duct passing through the core engine is radially spaced from each secondary flow duct.

4. The aircraft turbofan engine in accordance with claim 3, wherein relative to a flow direction an axially front end of the primary flow duct is provided behind each of the at least two fans.

5. The aircraft turbofan engine in accordance with claim 3, wherein relative to a flow direction an axially rear end of the primary flow duct is provided in front of each of the at least two low-pressure turbines.

6. The aircraft turbofan engine in accordance with claim 4, wherein behind each of the at least two fans and in front of each of the at least two low-pressure turbines the primary flow duct or part-ducts of the primary flow duct run in a curve, passing through a turning point of the curve.

7. The aircraft turbofan engine in accordance with claim 1, wherein the primary flow duct forms at an axially front end thereof at least two ducts which merge in front of the core engine, where each duct is associated with one of the at least two fans, so that part of the airflow passing a respective one of the at least two fans is guided into each of the at least two ducts.

8. The aircraft turbofan engine in accordance with claim 1, wherein the primary flow duct splits behind the core engine into at least two ducts which each lead to one of the at least two low-pressure turbines.

9. The aircraft turbofan engine in accordance with claim 1, wherein the core engine is arranged offset to a plane defined by the at least two low-pressure shafts.

10. The aircraft turbofan engine in accordance with claim 1, wherein the engine includes at least one outer casing that defines a plurality of secondary flow ducts matching a quantity of the at least two fans.

11. The aircraft turbofan engine in accordance with claim 1, wherein the at least one secondary flow duct ends in an axial direction in front of the primary flow duct.

12. The aircraft turbofan engine in accordance with claim 1, wherein the core engine further includes a medium-pressure compressor and a medium-pressure turbine coupled to one another by a medium-pressure shaft.

* * * * *